United States Patent
Bellasalma

(10) Patent No.: US 6,623,685 B2
(45) Date of Patent: Sep. 23, 2003

(54) METHOD OF PREMIXING FIBER AND PLASTIC MATRIX

(75) Inventor: Gerard Jay Bellasalma, Yorba Linda, CA (US)

(73) Assignee: Masco Corporation, Taylor, MI (US)

( * ) Notice: Subject to any disclaimer, the term of this patent is extended or adjusted under 35 U.S.C. 154(b) by 60 days.

(21) Appl. No.: 09/863,190

(22) Filed: May 23, 2001

(65) Prior Publication Data

US 2002/0175447 A1 Nov. 28, 2002

(51) Int. Cl.[7] ............................................... B29C 45/00
(52) U.S. Cl. ................................ 264/328.18; 264/328.6
(58) Field of Search ....................... 264/328.18, 328.19, 264/328.8, 328.17, 105, 328.6; 428/407

(56) References Cited

U.S. PATENT DOCUMENTS

| | | | | |
|---|---|---|---|---|
| 3,734,985 A | * | 5/1973 | Greenberg | 264/45.3 |
| 4,518,653 A | * | 5/1985 | McWilliams et al. | 428/378 |
| 5,653,534 A | * | 8/1997 | Matsumoto et al. | 366/76.1 |
| 6,071,462 A | * | 6/2000 | Putsch | 264/328.14 |
| 6,165,396 A | * | 12/2000 | Sato et al. | 264/45.3 |
| 6,363,749 B1 | * | 4/2002 | Jenkner et al. | 65/60.3 |
| 6,390,661 B1 | * | 5/2002 | Bellasalma et al. | 366/162.3 |

* cited by examiner

*Primary Examiner*—Jill L. Heitbrink
*Assistant Examiner*—Monica A Fontaine
(74) *Attorney, Agent, or Firm*—Carlson, Gaskey & Olds

(57) ABSTRACT

A method of reducing the restrictions of mixing fiber reinforced plastic includes the step of first coating the fiber. The coating is of a sort which will prevent the fiber from beginning to absorb the plastic such that the combined plastic and fiber may be stored for a period of time. Once the combined fiber and plastic are moved towards a mold, a mix station preferably cracks the coating. This allows the fiber to absorb the plastic matrix. The combined fiber and plastic is then delivered into a mold. By allowing the fiber to be pre-mixed with the plastic, the requirement of a "mix room" for mixing fiber into a plastic matrix adjacent to a molding facility is eliminated.

6 Claims, 1 Drawing Sheet

METHOD OF PREMIXING FIBER AND PLASTIC MATRIX

BACKGROUND OF THE INVENTION

This application relates to a method of coating fibers mixed into a plastic matrix, such that the fibers do not begin to cure, or react with the matrix until the coating is broken, just prior to the matrix/fibers being delivered into a mold.

Plastics with incorporated reinforcement fibers are widely utilized in many molding operations. The fiber provides strength to the molded part. As molded parts are becoming more prevalent for more challenging applications, the use of the fiber reinforced plastic also becomes more prevalent.

As the fiber pieces are mixed into a plastic matrix, the plastic matrix is absorbed by the fibers, and in the process, the fibers will expand and displace more volume. With this expansion, viscosity increases dramatically. The mixture quickly becomes very difficult to move. It is typical that the various components being delivered into a injection mold are delivered by pumps from storage canisters. If the fibers and the plastic matrix have been mixed for any length of time, the mixture is often too thick to move by standard pumps. Thus, it is typical that the fiber is mixed into the plastic matrix at the location of the molding, and shortly before molding begins. While this has proven acceptable, it does put restraints on pre-mixing of the fiber and plastic, and further requires that any location where one wishes to injection mold fiber-reinforced plastics must also be provided with a fiber/plastic matrix mixing facility. Mixing of the fiber and plastic is a somewhat challenging application in that the fibers can mix into the surrounding air. Thus, methods of segregating and cleaning the air in the mixing room are required. As can be appreciated, this places further restrictions on where injections molding of fiber-reinforced plastics can occur. A local, and expensive, mixing room is required.

SUMMARY OF THE INVENTION

In a disclosed embodiment of this invention, glass fibers are coated with a coating that prevents the fiber from absorbing with a plastic matrix. The coated fibers are then mixed into the plastic matrix. Since the coating prevents the absorption, the fibers can be mixed into the plastic matrix and then transported to a molding location. Thus, the restrictions as mentioned above are eliminated. The plastic matrix including the coated fibers is passed through a mixing station on the way to a mold. The mixing station is preferably provided with rotating screw members which crack the coating. Once the coating is cracked or otherwise broken, then the absorption as mentioned above will begin. However, the mixed plastic and fibers are then being immediately delivered to the mold. The absorption is as intended, rather than complicating the transportation of the mixture.

In preferred embodiments, the coating of the glass fibers is of a SILANE™, or an epoxy, or a combination of the two. However, any type of coating which will delay the fiber being able to absorb the plastic matrix would be within the scope of this invention. Particular coating agents include epoxylated phenolics, epoxylated carboxylic acids, polymers of unsatured epoxides, epoxidated dienes or polyenes, and mixtures of any of the foregoing. The above are examples of thermo set coating. Also, polystyrene thermoplastics may be used as one example.

The fibers are preferably glass fibers or strands. The invention may also be used on filamentary materials such as thermoplastic synthetic fibers like polyesters, nylons and cellulous acetate. Preferably the coating is applied after the formation of the fibers, and while the fibers are in the forms of strands, yarns or rovings. The glass fibers may be any glass fiber produced from fiberizable heat-softened glass. Examples include well known fiberizable glass compounds like "E-glass" and "621-glass". Also, other acceptable derivatives of "E-glass" and "621-glass" can be used such as low or free-floating and/or boron fiberizable glass compositions.

The length of the glass filaments and whether or not they are bundled into fibers and the fibers bundled in turn to yarns, ropes or rovings is not critical to this invention. Moreover, the composition of the plastic matrix while perhaps important to the molding of any particular item, is not critical to the coating and storing aspects of this invention.

While glass fibers are preferably utilized, other reinforcements including carbon fibers, aramid fibers, KEVLAR, polyesters and the like, and even wood or other organic fibers can benefit from this invention.

The exact details and methods for forming the coated fibers are best understood from co-pending patent application, Ser. No. 09/829,095, filed Apr. 9, 2001, assigned to the assignee of the present application, and entitled "Coated Fibers and Process" and naming the inventor Jay Bellasalma, who is also an inventor of the present application.

The coated fibers are premixed into a plastic matrix, and may then be stored in a storage container such as is commonly used for the plastic matrix. These containers can then be transported to a molding location. In this way, a single location can be used for the mixing of the fiber and plastic matrix for a plurality of molding locations. Once at the molding location, the material is moved from the container through the mixing head and into the mold. As mentioned above, the mixing head will crack the coating, and allow the fibers to begin to absorb the matrix.

The present invention minimizes the complexity and requirement for specific "mixing rooms" and the like as exist today. With this invention, fibers may be mixed into the plastic matrix, and stored. The fibers may thus be mixed into the plastic matrix at a location remote from the molding station. In this way, the mixing rooms which require complex air treatment systems need not be provided at every location where molding is to occur. Rather, pre-mixed plastic matrix and fiber may be shipped to molding locations remote from the mixing location. This simplifies the use of fiber-reinforced plastic for molding purposes.

One structure for moving the plastic is disclosed in U.S. patent application Ser. No. 09/662,302 entitled "Rapid Discharge Multiple Material Delivery System" and filed on Sep. 15, 2000. One structure of the preferred mixing head is disclosed in co-pending patent application Ser. No. 09/662,662 now U.S. Pat. No. 6,536,936 entitled "Mix Head Assembly For a Molding Material Delivery System" and filed on Sep. 15, 2000.

These and other features of the present invention can be best understood from the following specification and drawings, the following of which is a brief description.

DETAILED DESCRIPTION OF A PREFERRED EMBODIMENT

Figure 1:
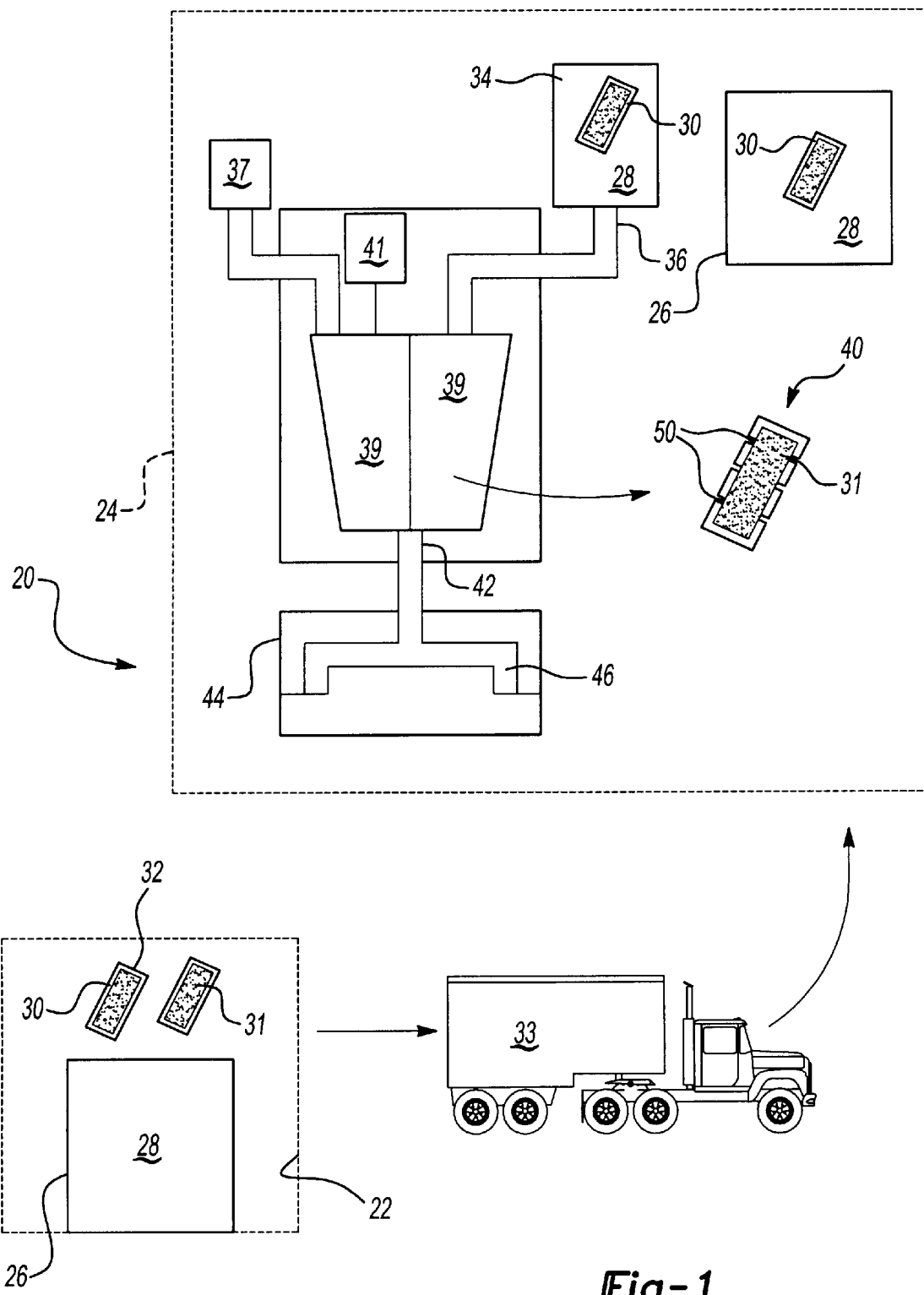
FIG. 1 is a schematic view of the process of coating, mixing and molding fiber-reinforced plastic.

As shown in the sole figure, a method 20 is performed at a first mixing location 22, and a second molding location 24.

At the mixing location 22, a container 26 receives an underlying plastic matrix 28 and a coated combination 30 of an underlying fiber 31 and an outer coating material 32. Preferably, the fiber is a glass fiber with varying sizes, and the coating is a coating similar to SILANE™, or epoxy, or a combination thereof. Specific coating examples will be discussed below. Once coated, the fiber may be mixed into the plastic matrix. The coating will prevent the fiber from beginning to absorb the plastic matrix, such that the combined coated fiber 30 and plastic 28 can be stored in the container 26 and transported, such as shown schematically on the vehicle 33 to a molding location 24. The container 26 containing the coated fiber 30 and the plastic matrix 28 may then be stored at the location 24. As shown at 34, the container is eventually connected to a delivery system, shown schematically at 36. The delivery system is preferably such as disclosed in U.S. Pat. No. 6,390,661 entitled "Rapid Discharge Multiple Material Delivery System" filed on Sep. 15, 2000 and assigned to the assignee of the present application. As is known, other materials such as shown in 37, are also delivered into a mixing head 38. The other materials would include catalysts, filler material, etc.

The mixing head 38 is preferably as shown in U.S. patent application Ser. No. 09/662,662 now U.S. Pat. No. 6,536,936 entitled "Mix Head Assembly For a Molding Material Delivery System", filed on Sep. 15, 2000 and assigned to the assignee of the present application. The mixing head 38 includes rotating rotors 39 driven by a motor 41, shown schematically. The rotating rotors 39 will mix the materials 37, 28 and 30. Moreover, and more importantly for purposes of this invention, the rotors 39 crack the coating 32, such that as shown at 40, the coating is broken away from the underlying fiber 31 at locations 50. The illustration and the term "cracking" may be an oversimplification, however, the rotors 39 somehow expose the fiber 31 to the matrix in some fashion. For purpose of this application, "cracking" should be interpreted in this fashion. At this point, the plastic matrix 34 begins to be absorbed by the underlying fiber 31. The material is then delivered through an inlet 42 into a mold 44, and a cavity 46. The mold 44 and cavity 46 are shown schematically. Most preferably, this invention is utilized in a molding operation for making quite large parts. As an example, tub and bathtub surrounds are preferably molded with this particular method. However, the method would extend to the molding of any fiber-reinforced art.

The present invention thus provides a way of achieving mixing of fiber and plastic matrix at one location, while still maintaining the material in a state such that it can be stored, transported to another location and stored again without the absorption beginning. The present invention thus simplifies the requirement for molding plastic reinforced by fiber as is the present case.

Any type of coating which will delay the fiber being able to cure in its plastic matrix would be within the scope of this invention. Particular coating agents include epoxylated phenolics, epoxylated carboxylic acids, polymers of unsatured epoxides, epoxidated dienes or polyenes, and mixtures of any of the foregoing. Also, thermoplastics as mentioned above can be used.

The amount of coated glass fibers mixed into the plastic matrix is preferably between 1 and 65% by weight, and more preferably 20 to 50% by weight. The glass fibers may be in any shape, either long fibers or short fibers, as long as the coating mixture can be coated onto the surface of the glass fibers. The coating may be as high as 15% by weight. More typically the coating ranges from 5 to 10% by weight, with actual examples between 7 and 9%.

The fibers are preferably glass fibers or strands. The invention may also be used on filamentary materials such as thermoplastic synthetic fibers like polyesters, nylons and cellulous acetate. Preferably the coating is applied after the formation of the fibers, and while the fibers are in the forms of strands, yarns or rovings. The glass fibers may be any glass fiber produced from fiberizable heat-softened glass. Examples include well known fiberizable glass compounds like "E-glass" and "621-glass". Also, other acceptable derivatives of "E-glass" and "621-glass" can be used such as low or free-floating and/or boron fiberizable glass compositions.

The length of the glass filaments and whether or not they are bundled into fibers and the fibers bundled in turn to yarns, ropes or rovings are not critical to this invention. Moreover, the composition of the plastic matrix while perhaps important to the molding of any particular item, is not critical to the coating and storing aspects of this invention.

While glass fibers are preferably utilized, other reinforcements including carbon fibers, aramid fibers, KEVLAR, polyesters and the like, and even wood or other organic fibers can benefit from this invention.

The exact details and methods for forming the coated fibers are best understood from co-pending patent application Ser. No. 09/829,095, filed Apr. 9, 2001, and entitled "Coated Fibers and Process" and naming the inventor Jay Bellasalma, who is also an inventor of the present application.

Although preferred embodiments of this invention have been disclosed, a worker in this art would recognize that modifications would come within the scope of this invention. For that reason the following claims should be studied to determine the true scope and content of this invention.

What is claimed is:

1. A method of making a fiber-reinforced part comprising the steps of:

1) mixing a fiber coated with a protective coating with an underlying plastic matrix;

2) moving said coated fiber and plastic matrix into a mix head, said mix head being constructed to crack said coating; and 3) delivering said plastic matrix with said fiber having the cracked coating into a mold.

2. A method as set forth in claim 1, further comprising coating of the fiber and the mixing of the fiber with the plastic matrix occurs at a first location, after which a combination of said plastic and said coated fibers are stored in a container, and then delivered to molding location prior to said step 2).

3. A method as set forth in claim 1, wherein said mix head includes a driven rotor which is designed to crack said coating.

4. A method as set forth in claim 1, wherein said coating includes epoxy.

5. A method as set forth in claim 1, wherein said coating is polystyrene.

6. A method as set forth in claim 1, wherein the combined weight of said fiber and said coating includes less than 15% by weight coating.

* * * * *